United States Patent
Natsume et al.

(10) Patent No.: US 6,523,138 B1
(45) Date of Patent: Feb. 18, 2003

(54) INPUT/OUTPUT PROCESSING SYSTEM (75) Inventors: Keiji Natsume, Hadano (JP); Hideaki Shibata, Isehara (JP)

(73) Assignees: Hitachi, Ltd., Tokyo (JP); Hitachi Information Technology Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/455,366

(22) Filed: Dec. 6, 1999

(30) Foreign Application Priority Data

Dec. 7, 1998 (JP) .......................................... 10-347223

(51) Int. Cl.⁷ ................................................ H04B 1/74
(52) U.S. Cl. .................................. 714/43; 714/9; 714/43
(58) Field of Search ................................ 714/43, 9, 56, 714/11, 6; 710/1

(56) References Cited

U.S. PATENT DOCUMENTS

| | | | | |
|---|---|---|---|---|
| 3,564,502 A | * | 2/1971 | Boehner et al. | ............... 714/43 |
| 4,974,147 A | * | 11/1990 | Hanrahan et al. | ............. 714/24 |
| 5,297,262 A | * | 3/1994 | Cox et al. | ...................... 710/36 |
| 5,438,675 A | * | 8/1995 | Fujioka | ....................... 710/15 |
| 5,502,728 A | | 3/1996 | Smith, III | |
| 5,504,882 A | | 4/1996 | Chai et al. | |
| 5,668,943 A | * | 9/1997 | Attanasio et al. | .............. 714/15 |
| 6,216,179 B1 | * | 4/2001 | Murata et al. | ................. 710/38 |

* cited by examiner

*Primary Examiner*—Robert Beausoliel
*Assistant Examiner*—Yolanda L. Wilson
(74) *Attorney, Agent, or Firm*—Mattingly, Stanger & Malur, P.C.

(57) ABSTRACT

An input/output processing system wherein even when one of channel processors has become faulty, channels so far controlled by the faulty channel processor can be controlled by the other normal channel processor, so that input/output devices can be continuously used. The system is configured such that channels (CHs) so far connected only to a first channel processor (CHP) are also connected to a second channel processor (CHP), and channels (CHs) so far connected only to the second channel processor (CHP) are also connected to the first channel processor (CHP). Thereby the first and second channel processors (CHPs) can be multiplexedly connected to the channels (CHs) to allow the channel processors (CHPs) to control all the channels (CHs).

6 Claims, 10 Drawing Sheets

SELECT

FIG.5

TABLE 20

| LOGICAL CH NUMBER 0 | PHYSICAL CH NUMBER 0 | CHP0 |
|---|---|---|
| LOGICAL CH NUMBER 1 | PHYSICAL CH NUMBER 1 | CHP1 |
| LOGICAL CH NUMBER 2 | PHYSICAL CH NUMBER 2 | CHP0 |
| ⋮ | ⋮ | ⋮ |
| LOGICAL CH NUMBER i | PHYSICAL CH NUMBER i | CHP1 |

FIG.6

TABLE 20

| LOGICAL CH NUMBER 0 | PHYSICAL CH NUMBER 0 | CHP1 |
|---|---|---|
| LOGICAL CH NUMBER 1 | PHYSICAL CH NUMBER 1 | CHP1 |
| LOGICAL CH NUMBER 2 | PHYSICAL CH NUMBER 2 | CHP1 |
| ⋮ | ⋮ | ⋮ |
| LOGICAL CH NUMBER i | PHYSICAL CH NUMBER i | CHP1 |

INPUT/OUTPUT PROCESSING SYSTEM

BACKGROUND OF THE INVENTION

The present invention relates to input/output processing systems and more particularly, to an input/output processing system which connects a plurality of channels and a plurality of channel processors to allow each channel processor to control the channels.

As a computer system increases in scale, the number of input/output devices connected to the system has been increased in these years. In actual situations, however, the number of channels in the computer system cannot be increased satisfactorily due to physical and logical restrictions. As a result, for the purpose of improving the reliability of the computer system, in spite of the fact that it is desirable to connect the input/output devices to a plurality of channels, the conventional computer system can, in many cases, connect the input/output device to only one channel.

Figure 14:
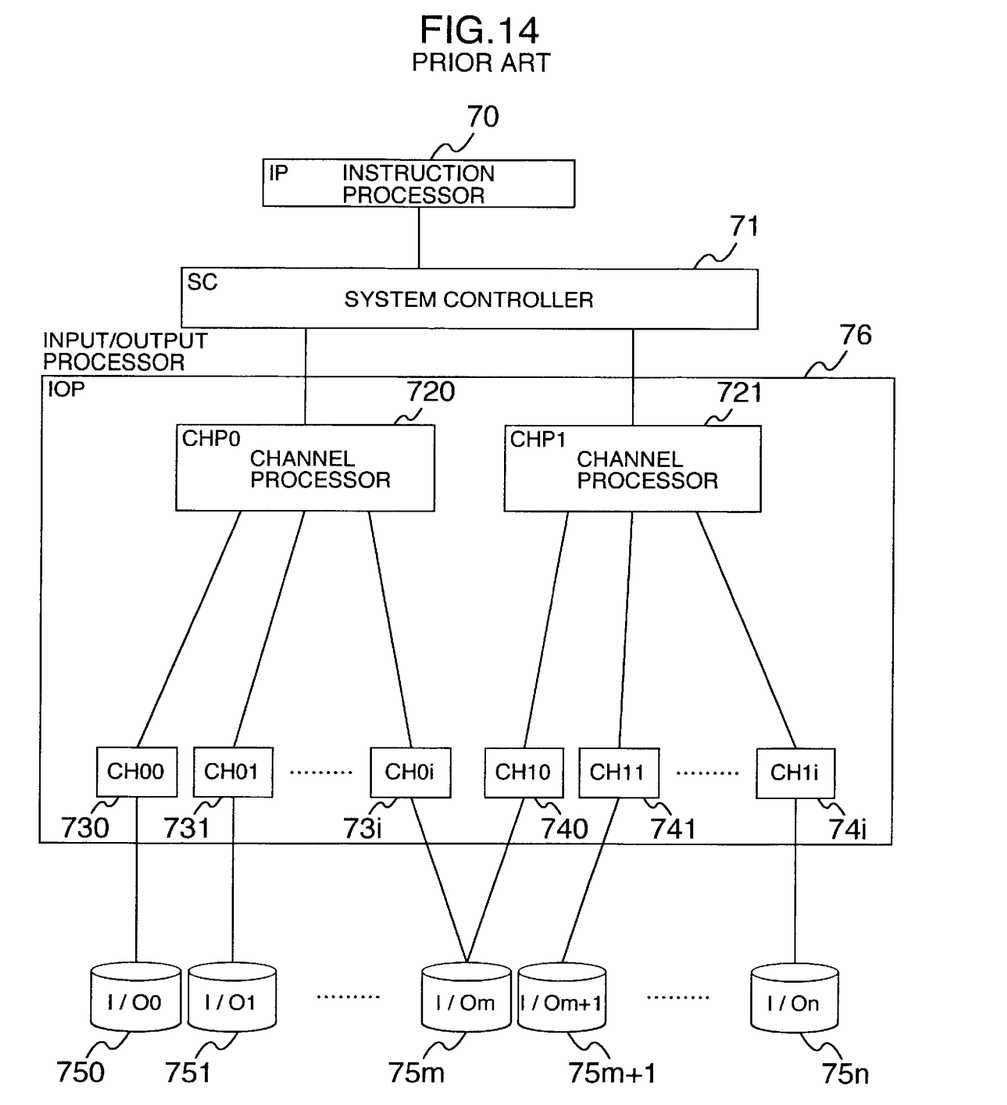
FIG. 14 is a block diagram of an arrangement of a prior art input/output processing system in a computer system.

FIG. 14 is a block diagram of an arrangement of a prior art input/output processing system in a computer system. Explanation will be made as to the arrangement of the prior art input/output processing system. In FIG. 14, reference numeral 70 denotes an instruction processor (IP), 71 denotes a system controller (SC), 720 and 721 denote channel processors (CHP0, CHP1), 730 to 73$i$ and 740 to 74$i$ denote channels (CH00 to CH0$i$ and CH10 to CH1$i$), 750 to 75$n$ denote input/output devices (I/O0 to I/On), and 76 denotes an input/output processor (IOP).

The prior art input/output processing system shown in FIG. 14 includes the instruction processor (IP) 70 as a central processing unit, the system controller (SC) 71 connected to the instruction processor (IP) 70, the two channel processors (CHP0 and CHP1) 720 and 721 connected to the system controller (SC) 71, the plurality of channels (CH00 to CH0$i$) 730 to 73$i$ connected to the channel processor (CHP0) 720, the plurality of channels CH10 to CH1$i$ and 740 to 74$i$ connected to the channel processor (CHP1) 721, and the input/output devices (I/O0 to I/On) 750 to 75$n$ connected to the respective channels (CH). In the illustrated example, only one (I/Om) 75$m$ of the plurality of input/output devices is connected to the two channels (CH0$i$ and CH10 under control of the different channel processors (CH0$i$ and CH10) and the other input/output devices are connected to respective one of the channels.

In the input/output processing system having such an arrangement as mentioned above, if the channel processor (CHP0) 720 became faulty for example, then the channels (CH00 to CH0$i$) 730 to 73$i$ cannot be used. As a result, the input/output devices (I/O0 to I/O(m–1)) 750 to 75(m–1) cannot be used because these input/output device have exchange paths. In the illustrated example, however, since the input/output device (I/Om) 75$m$ has an exchange path for the channel (CH10) 740 connected to the normal channel processor (CHP1) 721, the input/output device can be continuously used.

As has been explained above, the prior art input/output processing system is arranged so that the plurality of channels are controllably connected to each one of the channel processors. For this reason, the aforementioned prior art input/output processing system has had a problem that, if one of the channel processors connected to the many channels leading to the many input/output devices for controlling the channels becomes faulty, all the input/output devices connected to the faulty channel processor cannot be used because of no exchange paths therefor, resulting in that the damage of the system becomes severe.

SUMMARY OF THE INVENTION

It is therefore an object of the present invention to provide an input/output processing system which can solve the above problem in the prior art, and wherein channel processors are multiplexed so that a plurality of channels are connected to a plurality of channel processors to allow the plurality of channel processors to control the respective channels, whereby, even when one of the channel processors became faulty, the channels under control of the faulty channel processor can be controlled by the other normal channel processor and thus can be continuously used.

In accordance with an aspect of the present invention, to achieve above object, there is provided an input/output processing system which comprises a central processing unit, a plurality of channels performing data transfer with input/output devices, and a plurality of channel processors for controlling the plurality of channels, wherein each of the plurality of channels has paths connected to the plurality of channel processors and has first means, when it is desired for the central processing unit to initiate one of the channels, for determining one of the channel processors which initiates the channels in question, and the first means is a table showing relationships among logical channel numbers to be used by a program, physical channel numbers to be used by hardware, and usable channel processor numbers.

Another aspect of the invention provides second means, when an interruption is applied from the input/output device in question to the central processing unit, for determining one of the channel processors interruptable from the channel connected to the associated input/output device, wherein the first means is provided in a main storage, and the second means is provided in each of the channels.

In accordance with a further aspect of the invention, the first and second means are changed when one of the plurality of channel processors have become faulty in such a manner that the other normal channel processor initiates all the channels and receives an interruption from all the channels to perform input/output operation.

In accordance with another aspect of the invention, a fault in the channel processor is detected by a service processor, an instruction is issued from the service processor to the other channel processor to connect the channels so far connected to the faulty channel processor to the other normal channel processor, and the first and second means are changed by the channel processor receiving the instruction; or after the faulty channel processor has been replaced by the normal channel processor during operation of the system, by initializing the replaced new channel processor by the service processor, an instruction is issued from the service processor to the new channel processor to connect the channels so far connected to the faulty channel processor to the new channel processor, and changing the first and second means by the new channel processor receiving the instruction.

DESCRIPTION OF THE PREFERRED EMBODIMENTS

An embodiment of an input/output processing system in accordance with the present invention will be detailed with reference to accompanying drawings.

Figure 1:
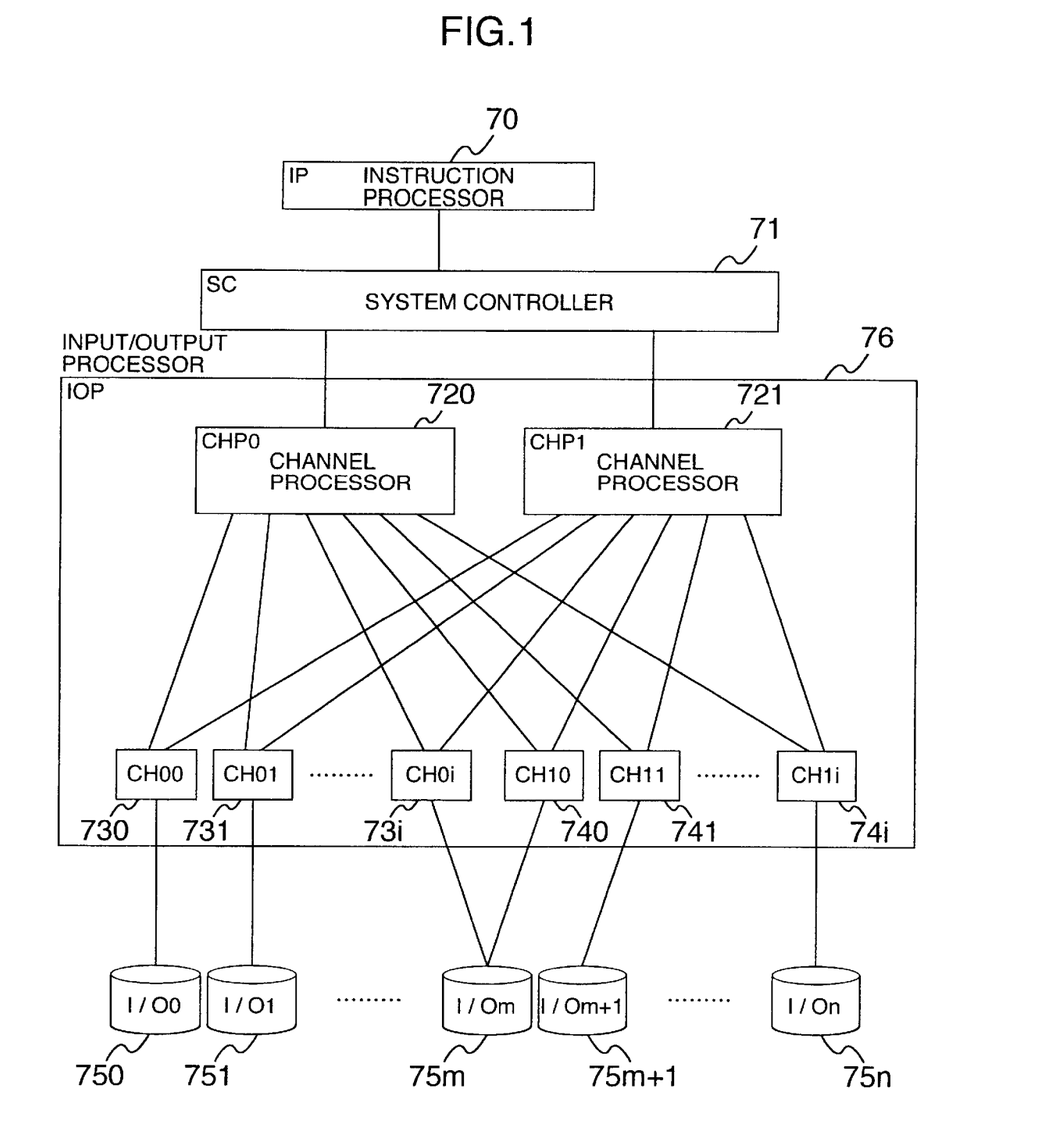
FIG. 1 is a block diagram of a schematic arrangement of an input/output processing system in accordance with an embodiment of the present invention.

Referring to FIG. 1, there is shown a block diagram of a schematic arrangement of the input/output processing system in accordance with the embodiment of the present invention, in which identical parts in FIGS. 1 and 14 are denoted by the same reference numerals. The embodiment of the present invention shown in FIG. 1 is used for explaining a conception when the present invention is applied to the prior art of FIG. 14. As is seen from FIG. 1, the embodiment of FIG. 1 is different from the prior art of FIG. 14 in that the channel processor (CHP0) 720 and channel processor (CHP1) 721 in the prior art are connected as multiplexed to the channels (CH00 to CH0$i$) 730 to 73$i$ and to channels (CH10 to CH1$i$) 740 to 74$i$. That is, in the embodiment of the invention shown in FIG. 1, the channels (CH10 to CH1$i$) 740 to 74$i$ connected only to the channel processor (CHP1) 721 in the prior art are also connected to the channel processor (CHP0) 720, and the channels (CH00 to CH0$i$) 730 to 73$i$ connected only to the channel processor (CHP0) 720 in the prior art are also connected to the channel processor (CHP1) 721.

As mentioned above, the multiplexed connection between the channel processors (CHP0 and CHP1) 720 and 721 and the channels (CH00 to CH0$i$ and CH10 to CH1$i$) 730 to 73$i$ and 740 to 74$i$ in the input/output processing system of FIG. 1 enables each of the channel processors (CHP0 and CHP1) 720 and 721 to control all the channels (CH00 to CH0$i$ and CH10 to CH1$i$) 730 to 73$i$ and 740 to 74$i$. In other words, even when one of the channel processors became faulty, the other channel processor can control all the channels and thus all the input/output devices can be continuously used, whereby damage to the computer system can be minimized.

Figure 2:
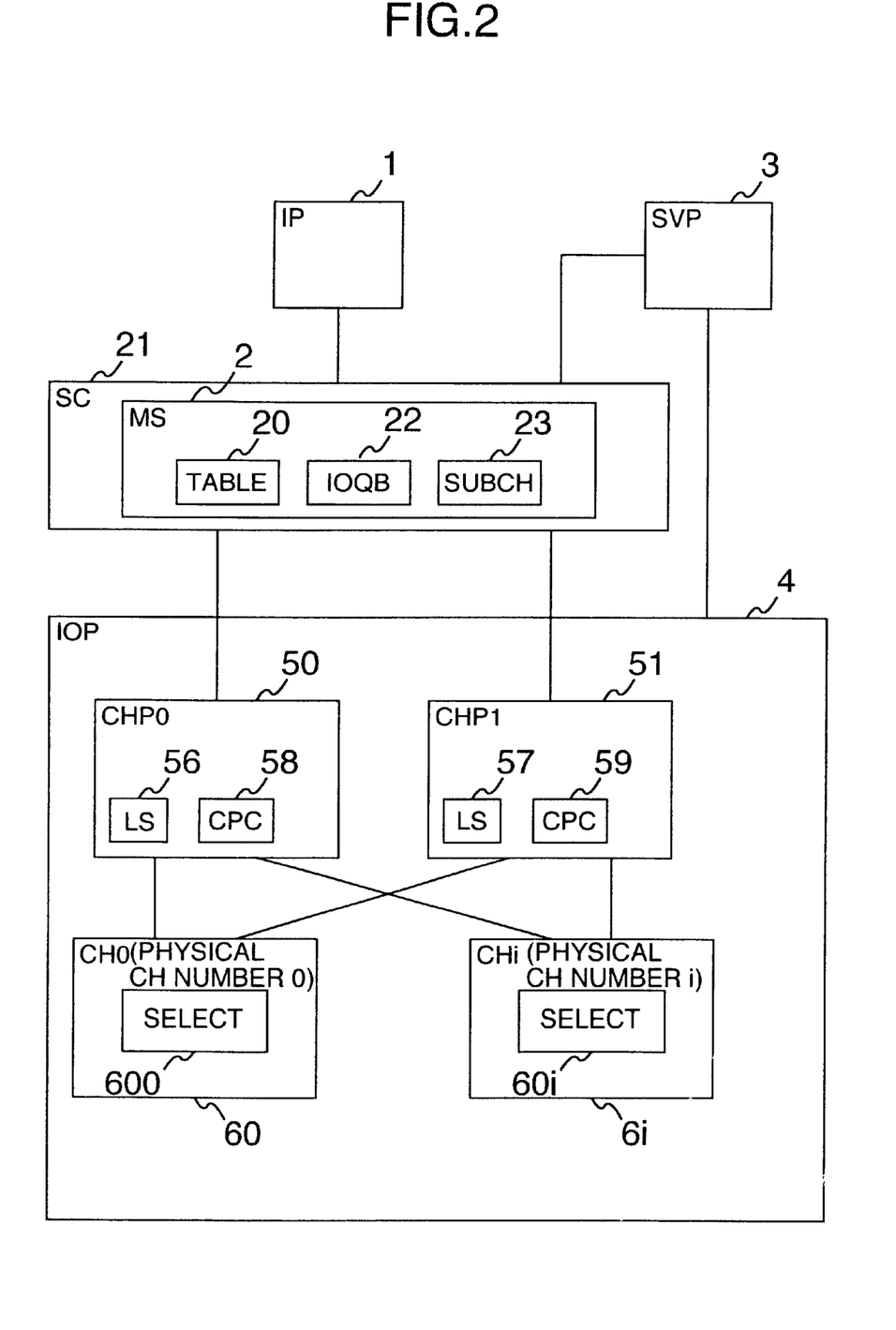
FIG. 2 is a block diagram of a specific arrangement of the input/output processing system in accordance with the embodiment of the present invention.
Figure 3:
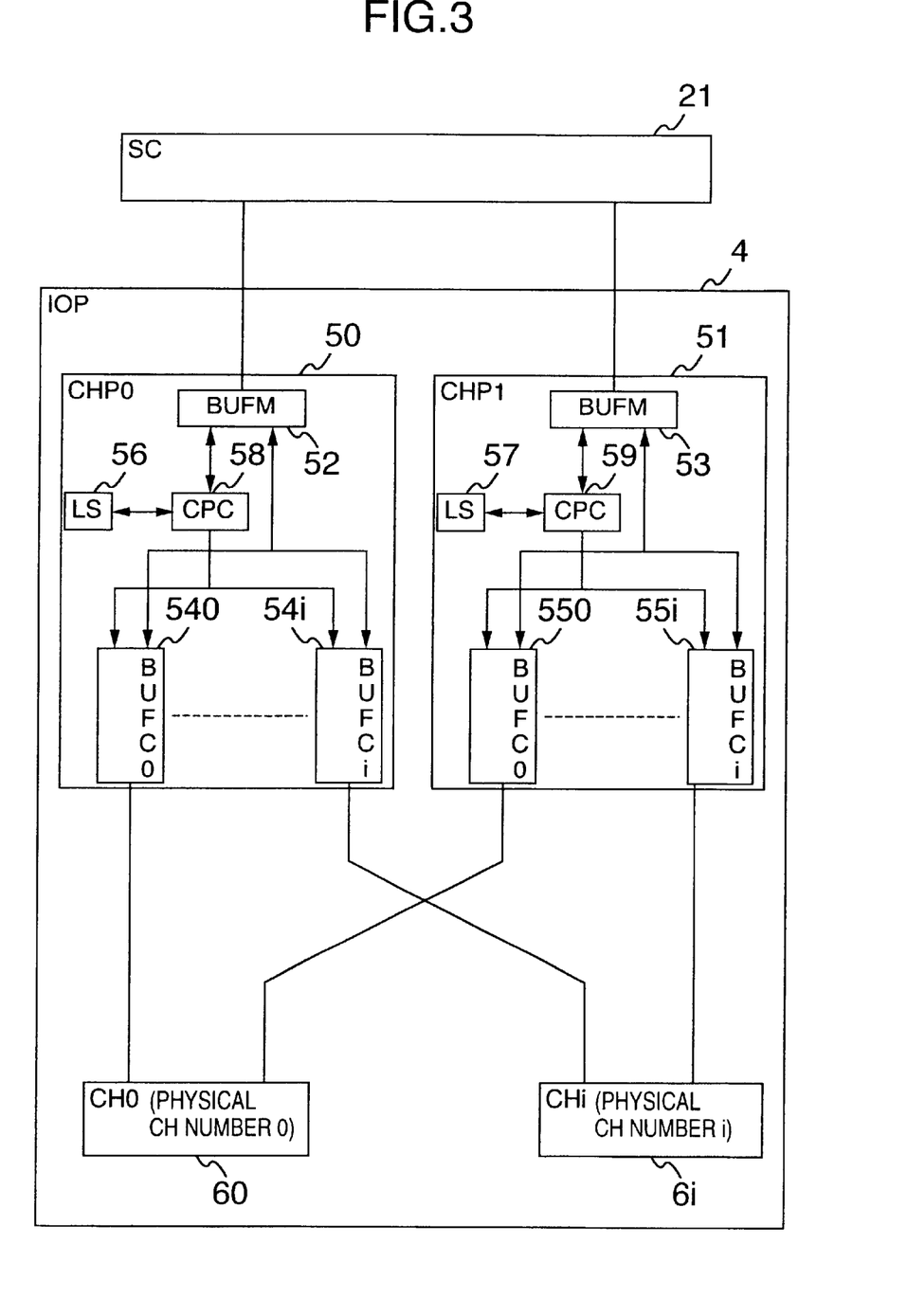
FIG. 3 is a block diagram of a detailed structure of a channel processor (CHP) in FIG. 2.
Figure 4:
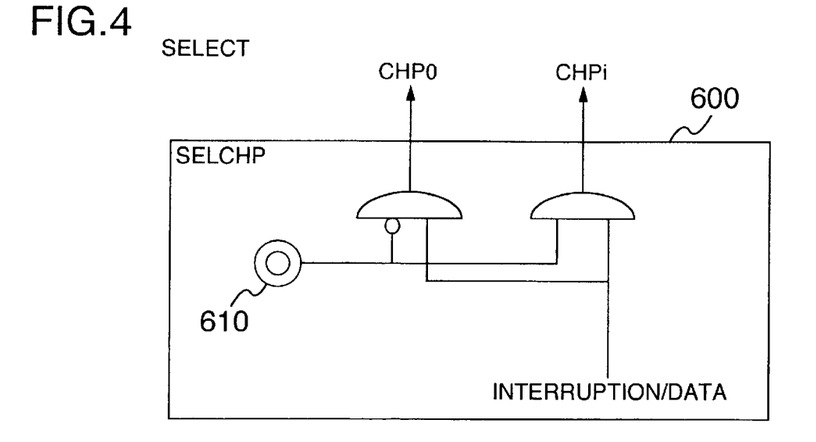
FIG. 4 is a block diagram of a selector SELECT provided in each channel (CH) in FIG. 2.

FIG. 2 is a block diagram of a specific arrangement of the input/output processing system of the embodiment of the present invention, FIG. 3 is a block diagram of a detailed structure of a channel processor in FIG. 2, and FIG. 4 is a block diagram of a detailed structure of a block SELECT provided within a channel CH in FIG. 2. In FIGS. 2 to 4, reference numeral 1 denotes an instruction processor (IP), 21 denotes a system controller (SC), 2 denotes a main storage (MS), 3 denotes a service processor (SVP), 4 denotes an input/output processor (IOP), 50 denotes a channel processor (CHP0), 51 denotes a channel processor (CHP1), 60 to 6$i$ denote channels (CH0 to CH$i$), 20 denotes a table which shows logical connection status among CHP and CHs (TABLE), 22 denotes an I/O initiation queue block (IOQB), 23 denotes a subchannel (SUBCH) for storing control information on I/O start therein, 56 and 57 denote local storages (LSs), 58 and 59 denote channel path controllers (CPCs) for controlling channel start and interruption under control of a microprogram, 600 to 60$i$ denote selectors (SELECTs) within the channels for controlling to which of the channel processors an interrupt is applied, 52 and 53 denote buffers (BUFMs) in the side of the system controller (SC), 540 to 54$i$ and 550 to 55$i$ denote buffers (BUFC0 to BUFC$i$) in the side of the channels, 610 denotes a flip-flop (SELCHP).

The input/output processing system according to the embodiment of the present invention has substantially the same arrangement as that of FIG. 1, except that, as shown in FIG. 2, the service processor (SVP) 3 is provided and the main storage (MS) 2 is provided within the system controller (SC) 21. And the table (TABLE) 20, I/O initiation queue block (IOQB) 22 and subchannel (SUBCH) 23 having such a structure as to be explained later are provided within the main storage (MS) 2; whereas the local storages (LSs) 56, 57 and channel path controllers (CPCs) 58 and 59 within the channel processors (CHP0 and CHP1) 50 and 51 respectively. Also provided within the channels (CHs) are the selectors (SELECTs) 600 to 60$i$ respectively.

Further provided within the channel processors (CHP0 and CHP1) 50 and 51, are the buffers (BUFMs) 52 and 53 connected to the system controller (SC) 21 as well as the buffer (BUFCs) 540 to 54$i$ and 550 to 55$i$ connected to the respective channels (CHs), as shown in FIG. 3. In the channel processors (CHP0 and CHP1) 50 and 51, data sent from the system controller (SC) 21 is first stored in the buffers (BUFMs) 52 and 53 and then moved to the buffers (BUFC0 to BUFC$i$) 540 to 54$i$ and 550 to 55$i$, which in turn are connected to the channels (CH0 to CH$i$) 60 to 6$i$ to which the data is to be transferred, after which the data is transferred to the channels (CHs). Data sent from the channels (CH0 to CH$i$) 60 to 6$i$, on the other hand, is first stored in the buffers (BUFC0 to BUFC$i$) 540 to 54$i$ and 550 to 55$i$ of the channel processors (CHP0 and CHP1) 50 and 51 connected to the channels (CHs) and then moved to the buffers (BUFMs) 52 and 53, after which the data is transferred to the system controller (SC) 21 respectively. Further, the channel path controllers (CPCs) 58 and 59 can send a start or interruption information or data via the buffers (BUFMs) 52 and 53 to the system controller (SC) 21 and also via the buffers (BUFC0 to BUFCi) 540 to 54i and 550 to 55i to the channels (CHs), respectively.

The selector (SELECT) provided within each channel (CH) has the flip-flop (SELCHP) 610 and two AND gates, as shown as a typical example by a selector (SELECT) 600 provided within the channel (CH0) 60 in FIG. 4. And the selector (SELECT) 600 transmits the interruption or data from the channel (CH0) 60 to the channel processor (CHP0) 50 when the flip-flop (SELCHP) 610 has a value '0', whereas, the selector (SELECT) 600 transmits the interruption or data from the channel (CH0) 60 to the channel processor (CHP1) 51 when the flip-flop (SELCHP) 610 has a value '1'.

In the input/output processing system of the embodiment of the present invention having such an arrangement as mentioned above, the channels (CH0 to CHi) 60 to 6i are logically connected to either one of the channel processors (CHP0 and CHP1) 50 and 51 for input/output processing, so that, when one of the channel processors became faulty, the channels (CHs), so far logically connected to the faulty channel processor and controlled thereby, are switched as logically connected to the normal channel processor to be controlled thereby, which results in that the channels (CHs) can be continuously used, that is, the I/O devices connected to the channels (CHs) can be continuously used.

Figure 5:
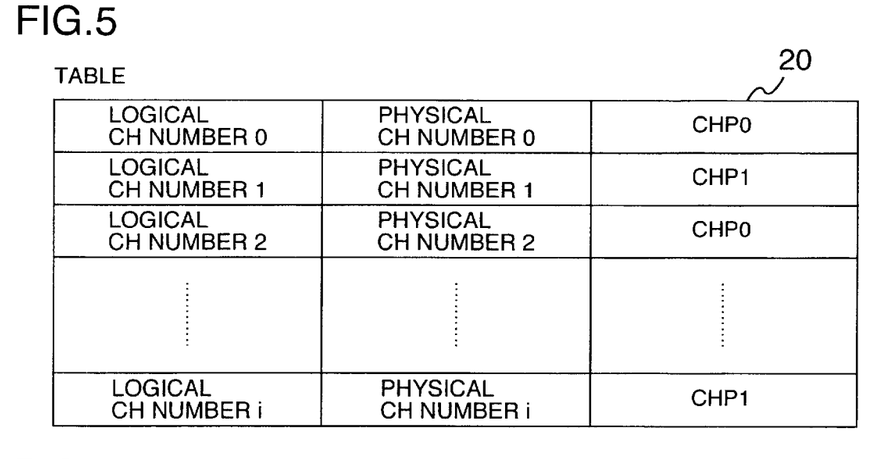
FIG. 5 is a table for explaining contents of a table TABLE stored in main storage (MS) 2.
Figure 6:
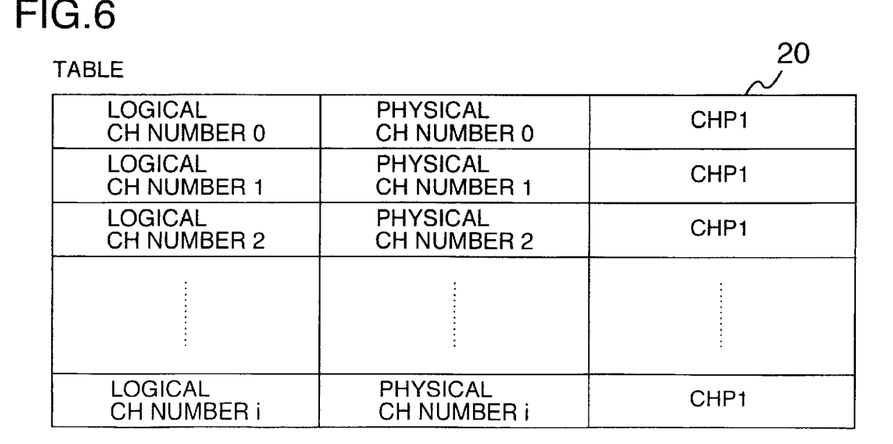
FIG. 6 is a table for explaining contents of the table (TABLE) rewritten due to the fact that the channel processor (CHP) became faulty.
Figure 7:
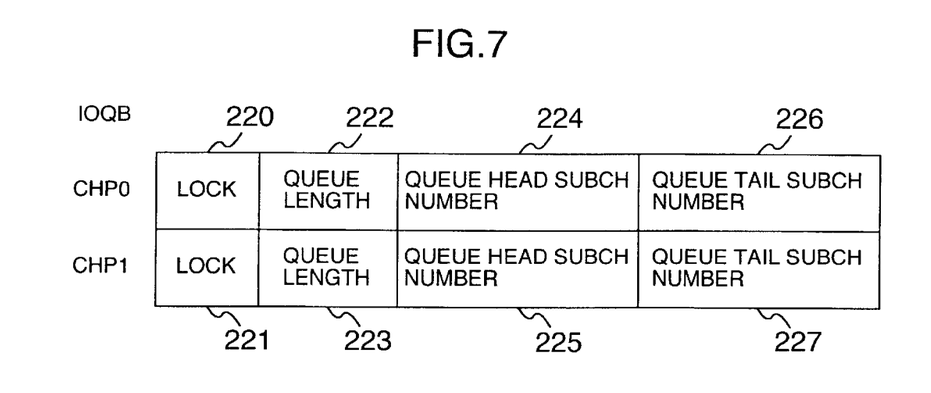
FIG. 7 is a diagram for explaining contents of an I/O initiation queue block (IOQB) stored in the main storage (MS)
Figure 8:
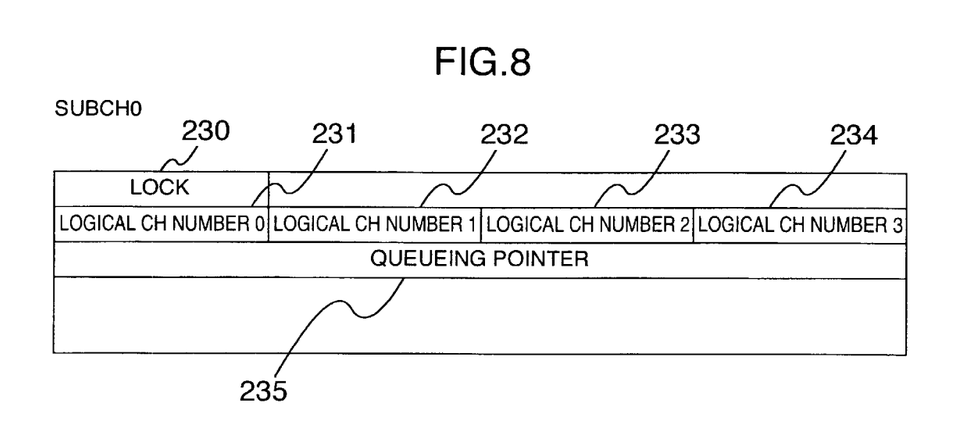
FIG. 8 is a diagram for explaining contents of a subchannel (SUBCH) provided as associated with the input/output devices of the subchannel (SUBCH) stored in the main storage (MS)
Figure 9:
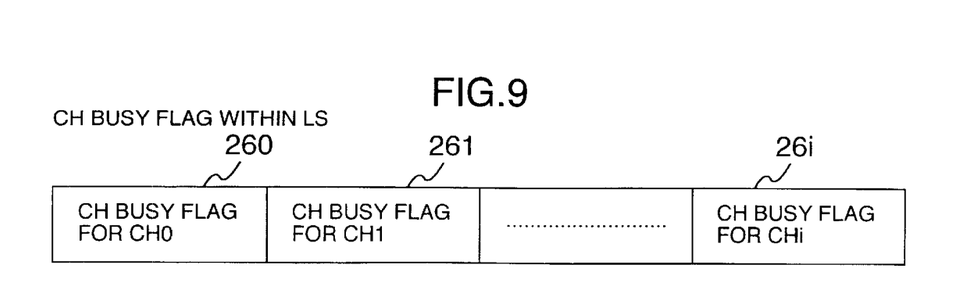
FIG. 9 is a diagram for explaining busy flags indicative of operational states of the channels (CHs) stored in a local storage (LS) within the channel processor (CHP)

FIG. 5 is a table for explaining contents of the table (TABLE) 20 stored in the main storage (MS) 2, FIG. 6 is a table for explaining contents of the table (TABLE) 20 written due to the fact that the channel processor (CHP0) 50 became faulty, FIG. 7 is a diagram for explaining contents of the I/O initiation queue block (IOQB) 22 stored in the main storage (MS) 2, FIG. 8 is a diagram for explaining the subchannel (SUBCH0) provided associated with the input/output devices of the subchannel (SUBCH) 23 stored in the main storage (MS) 2, and FIG. 9 is a diagram for explaining busy flags indicative of operational states of the channels (CHs) stored in the local storage (LS) 56 within the channel processors (CHP0 and CHP1) 50 and 51, which will be explained in the following.

In the aforementioned arrangement, it is always unnecessary to provide the table (TABLE) 20, I/O initiation queue block (IOQB) 22 and subchannel (SUBCH) 23 in the main storage (MS) 2, and these may be provided in the storage which can be commonly accessed by the instruction processor (IP) and channel processors (CHP) (input/output processor (IOP)). Further, it is always unnecessary to provide the service processor (SVP) for performing such a function as to be explained below, so long as the instruction processor (IP) or channel processors (CHP) (input/output processor (IOP)) can be arranged to execute the function.

The table (TABLE) 20 prescribes logical connection states between the channel processors (CHPs) and channels (CHs), with a logical CH number indicative of a channel (CH) to be activated, a physical CH number corresponding to the logical CH number, a CHP number indicative of the fact that to which of the channel processors (CHPs) the channels (CHs) are logically connected, as shown in FIG. 5. The channels (CHs) are connected as allocated to the channel processors (CHP0 and CHP1) having the CHP numbers of 0 and 1, as exemplified in FIG. 5.

Assume now that the channel processors (CHPs) and channels (CHs) have such logical connection states as shown in FIG. 5 and that the channel processor (CHP0) 50 became faulty during operation of the input/output processing system of FIG. 2. Then the table (TABLE) 20 of FIG. 5 is written to such a table as shown in FIG. 6. That is, due to the faulty channel processor (CHP0) 50, the channels (CHs) so far controlled by the channel processor (CHP0) 50 becomes inoperative. However, since these channels (CHs) are controllably connected to the channel processor (CHP1) 51, the contents of the table (TABLE) 20 of FIG. 5 is written as shown in FIG. 6.

The I/O initiation queue block (IOQB) 22 stored in the main storage (MS) 2 is used for controlling a queue of input/output devices to be activated for each channel processor (CHP). The I/O initiation queue block (IOQB) 22 stores therein the number of queued input/output devices to be activated for each channel processor (CHP), i.e., queue lengths 222 and 223, queue head SUBCH numbers 224 and 225, queue tail SUBCH numbers 226 and 227, and locks 220 and 221 to be used to prevent contentions between enqueueing operation of the instruction processor (IP) 1, enqueueing and dequeueing operations of the channel processors (CHP0 and CHP1) 50 and 51, as shown in FIG. 7.

The subchannel (SUBCH) 23 stored in the main storage (MS) 2 is provided as associated with the input/output devices and stores therein various types of information necessary for the input/output devices, but only information associated with the present invention as the representative subchannel (SUBCH0) is shown in FIG. 8. In the illustrated subchannel (SUBCH0), a lock 230 has a function similar to the locks 220 and 221 in the above I/O initiation queue block (IOQB) 22, and logical CH numbers 231 to 234 are selectable to activate the input/output devices associated with the subchannel (SUBCH0). A queueing pointer 235 is information necessary for forming a queue of input/output devices to be activated, and contains a SUBCH number, etc. to be next queued after the subchannel (SUBCH0).

Stored in the local storages (LSs) 56 and 57 within the channel processors (CHP0 and CHP1) 50 and 51 are busy flags 260 to 26i indicative of operational states of the channels (CHs) as shown in FIG. 9, so that, when the channel (CH) is activated or receives an interruption, the busy flag associated with the channel (CH) is set at '1', and after the operation is completed, the busy flag is set at '0'.

Figure 10:
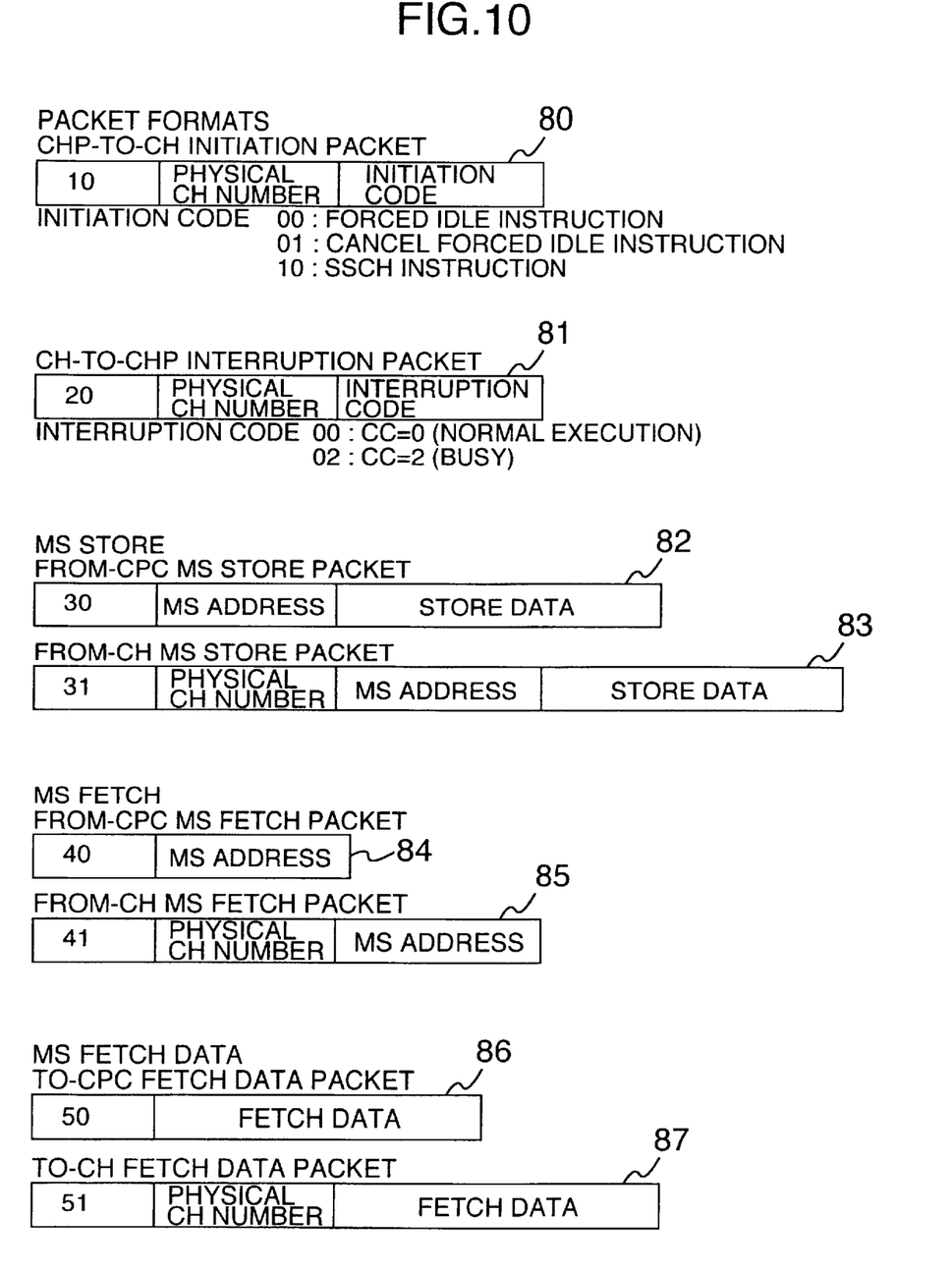
FIG. 10 shows diagrams for explaining formats of packets to be transferred between the system controller (SC), channel path controller (CPC) and channel (CH)

FIG. 10 show diagrams for explaining formats of packets to be transferred between the units of the system controller (SC) 21, channel path controllers (CPCs) 58 and 59, and channels (CH0 to CHi) 60 to 6i, which will be explained in the following.

An initiation packet 80 from the channel processor (CHP) to channel (CH), which is used to cause the channel path controller (CPC) 58 or 59 to activate the channel (CH), has a packet name 10, a physical CH number and an initiation code. The packet 80 transferred from the channel path controller (CPC) of the channel processor (CHP) is transferred to the channel (CH) through the buffer (BUFC) associated with the physical CH number contained in the packet 80. The initiation code prescribes a forced idle instruction, a cancel forced idle instruction and an SSCH (activation of the channel (CH)) instruction, as illustrated.

An interruption packet 81 from the channel (CH) to channel processor (CHP), which is used to apply an interruption from the channel (CH) to the channel path controller (CPC) 58 or 59, has a packet name 20, a physical CH number and an interruption code. The packet 81 issued from the channel (CH) is transferred to the channel path controller (CPC) through the buffer (BUFC) associated with the channel (CH). The channel path controller (CPC), when receiving the packet, recognizes the channel (CH) from which the interruption is made on the basis of the physical CH number in the packet. The interruption code has two states of normal execution and busy depending on a condition code CC.

An MS store packet 82 from the channel path controller (CPC) to the main storage (MS), which functions to demand MS storage from the channel path controller (CPC) 58 or 59 to the system controller (SC) 21, has a packet name 30, an MS address and store data. The packet 82 issued from the channel path controller (CPC) 58 or 59 is transferred to the system controller (SC) 21 through the buffer (BUFM) 52 or 53.

An MS store packet 83 from the channel (CH), which functions to demand MS storage from the channel (CH) to the system controller (SC) 21, has a packet name 31, a physical CH number, an MS address and store data. The packet 83 issued from the channel (CH) is transferred to the system controller (SC) 21 from the buffer (BUFC) associated with the channel (CH) through the buffer (BUFM) 52 or 53.

An MS fetch packet 84 from the channel path controller (CPC), which functions to demand MS fetch from the channel path controller (CPC) 58 or 59 to the system controller (SC) 21, has a packet name 40 and an MS address. The packet 84 issued from the channel path controller (CPC) 58 or 59 is transferred to the system controller (SC) 21 through the buffer (BUFM) 52 or 53.

A fetch data packet 86 to the channel path controller (CPC), which is a response to the from-CPC MS fetch packet 84, has a packet name 50 and fetch data. The packet 86 sent from the system controller (SC) 21 is transferred from the system controller (SC) 21 to the channel path controller (CPC) 58 or 59 through the buffer (BUFM) 52 or 53.

An MS fetch packet 85 from the channel (CH), which acts to demand MS fetch from the channel (CH) to the system controller (SC) 21, has a packet name 41, a physical CH number and an MS address. The packet 85 sent from the channel (CH) is transferred to the system controller (SC) 21 from the buffer (BUFC) associated with the channel (CH) through the buffer (BUFM) 52 or 53.

A fetch data packet 87 to the channel (CH), which is a response to the from-CH MS fetch packet 85, has a packet name 51, a physical CH number and fetch data. The packet 87 sent from the system controller (SC) 21 is transferred to the channel (CH) from the system controller (SC) 21 through the buffer (BUFM) 52 or 53 and the buffer (BUFC) associated with the physical CH number within the packet.

Figure 11:
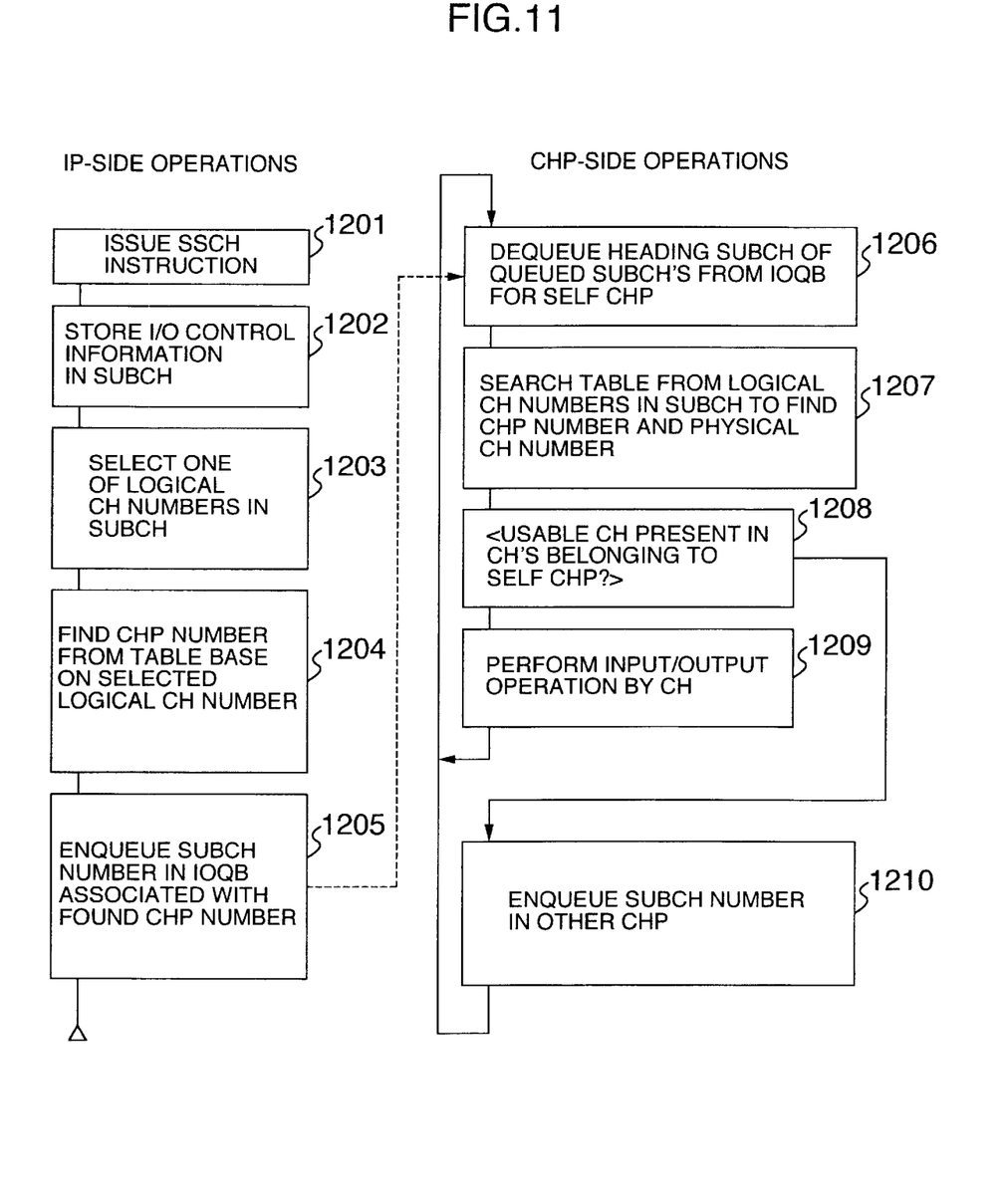
FIG. 11 is a flowchart for explaining operations of starting with issuance of an start subchannel (SSCH) instruction from an instruction processor (IP), selecting a channel (CH), and ending in performing input/output operation with use of the channel (CH)
Figure 12:
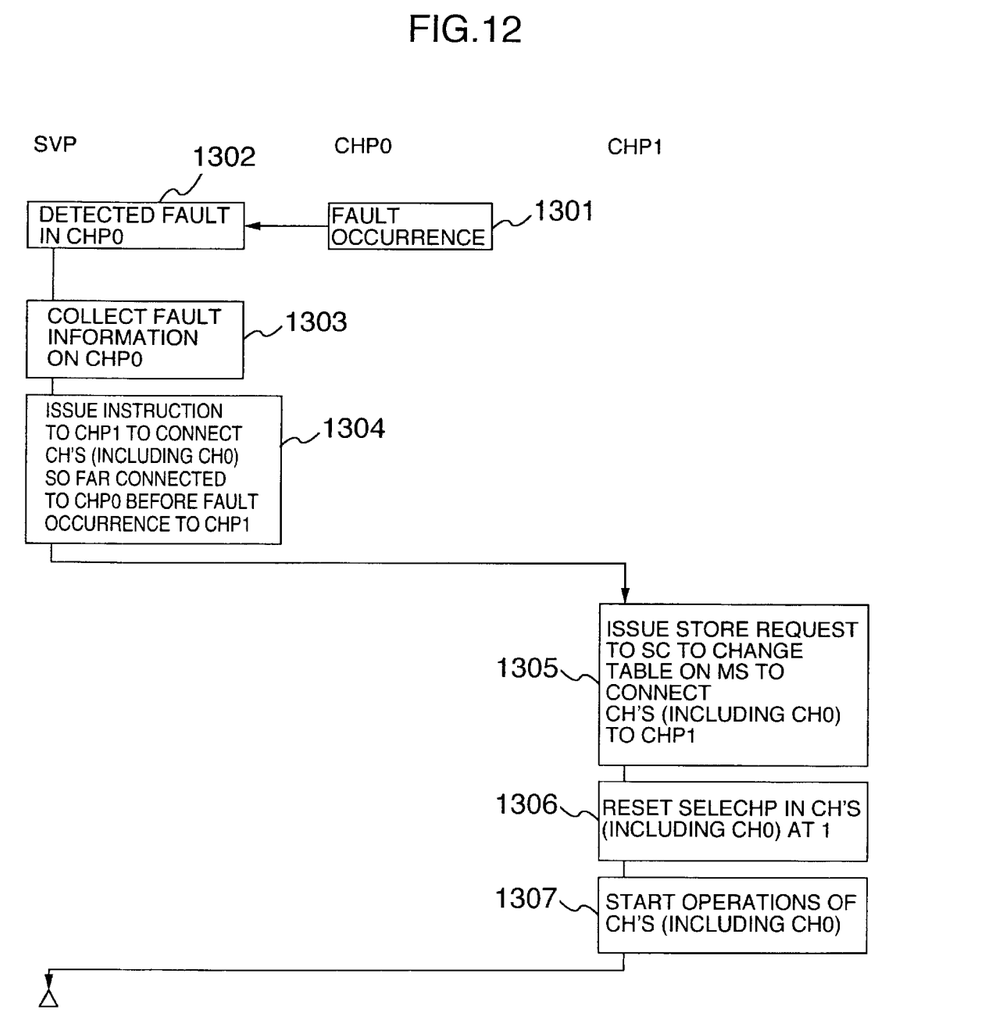
FIG. 12 is a flowchart for explaining a procedure, when a channel processor (CHP0) became faulty, of switchingly connecting logically channels (CHs) so far connected to the channel processor (CHP0) to a channel processor (CHP1) to continue the input/output operation.
Figure 13:
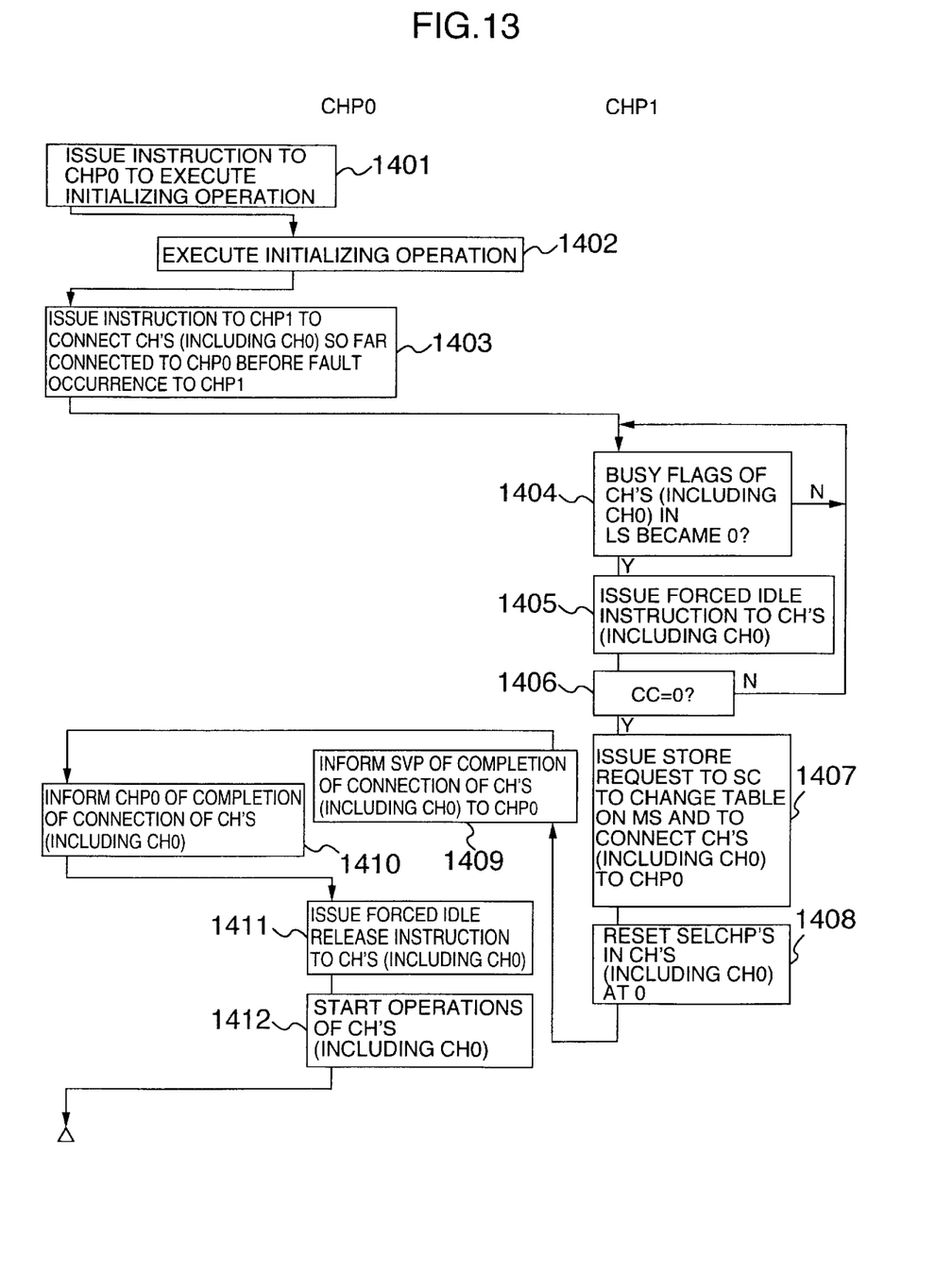
FIG. 13 is a flowchart for explaining a procedure, after a faulty channel processor (CHP) is replaced by the other normal channel processor (CHP) during operation of the system, of switchingly connecting logically the channels (CHs) so far connected to the faulty channel processor (CHP) to the normal channel processor (CHP) to continue the input/output operation.

FIG. 11 is a flowchart for explaining operations of starting with issuance of an SSCH (start subchannel) instruction from the program, selecting the channel (CH), and ending in input/output operation with use of the selected channel (CH). FIG. 12 is a flowchart for explaining a procedure, when the channel processor (CHP0) 50 became faulty, of logically switching the faulty channel processor to the channel processor (CHP1) 51 to connect the channels (CHs) so far connected to the faulty channel processor (CHP0) 50 to the normal channel processor (CHP1) 51 for continuous input/output operation. FIG. 13 is a flowchart for explaining a procedure, after the faulty channel processor (CHP) is exchanged during operation of the system, of logically switching the channel processor (CHP1) 51 to the channel processor (CHP0) 50 for continuous input/output operation. The operation of the input/output processing system according to the embodiment of the present invention will be explained by referring to the above flowcharts.

Assume now that the channel (CH0) 60 is logically connected to the channel processor (CHP0) 50 as an initial state. Then the channel (CH0) 60 having the CHP number of 0 is connected to the channel processor (CHP0) 50, as shown by the table (TABLE) 20 in FIG. 5. On the assumption that, under the above condition, an SSCH instruction is issued from the program to the input/output device associated with subchannel (SUBCH0), the flowchart of FIG. 11 will be below explained.

(1) An SSCH instruction is issued from the program, the instruction processor (IP) 1 stores input/output control information in the subchannel (SUBCH0) and selects one of the logical CH numbers within the subchannel (SUBCH0) shown in FIG. 8 (steps 1201 to 1203).

(2) When the instruction processor (IP) 1 selects, e.g., the logical CH number 0 in the step 1203, the instruction processor (IP) 1, by looking up the table (TABLE) 20 of FIG. 5, recognizes that the channel (CH) associated with the logical CH number 0 is the channel (CH0) 60 having the physical CH number 0 and that the channel (CH0) 60 is connected to the channel processor (CHP0) 50 (step 1204).

(3) On the basis of the found CHP number, the instruction processor (IP) 1 enqueues the subchannel (SUBCH0) to the I/O initiation queue block (IOQB) 22 associated with the channel processor (CHP0) 50 shown in FIG. 7 (step 1205).

(4) The channel processor (CHP0) 50 dequeues the subchannel (SUBCH0) from the I/O initiation queue block (IOQB) 22 associated with the channel processor (CHP0) 50, and looks up the table (TABLE) 20 of FIG. 5 with respect to the logical CH numbers selectable within the subchannel (SUBCH0) of FIG. 8 to find a CHP number and a physical CH number (steps 1206 and 1207).

(5) The channel processor (CHP0) 50, on the basis of the CHP number and physical CH number found in the step 1207, judges the presence or absence of usable one of the channels (CHs) under control of my channel processor (CHP). When judging that the channel (CH) having the logical CH number 0 is connected to my channel processor (CHP) and is the channel (CH0) 60 having the physical CH number 0, the channel processor (CHP0) 50 performs its input/output operation using the channel (CH), returns to the operation of the step 1206, and dequeues the next subchannel (SUBCH) to continue the operation (steps 1208 and 1209).

The input/output operation by the above channel (CH) is started by setting the initiation code of the CHP-to-CH initiation packet 80 at '10' and transmitting it to the channel (CH0) 60 to instruct the SSCH to the channel (CH0) 60. In response to the start of the input/output operation, the channel (CH0) 60 starts input/output operation to transfer the from-CH MS store packet 83, from-CH MS fetch packet 85 or to-CH fetch data packet 87 as the input/output data shown in FIG. 10 through the channel processor (CHP0) 50. Input/output operation termination interruption is carried out by transferring the interruption packet 81 shown in FIG. 10 to the channel processor (CHP0) 50.

(6) In the case of absence of the usable channel (CH) under control of my channel processor (CHP) in the step 1208, the channel processor (CHP0) 50 enqueues its SUBCH number to the I/O initiation queue block for the other CHP, i.e., channel processor (CHP1) 51 in this example. Thereafter the channel processor (CHP0) 50 returns to the operation of the step 1206 to dequeue the next subchannel (SUBCH) and continue the operation (step 1210).

Explanation will next be made as to the operation of the system when the channel processor (CHP0) 50 became faulty by referring to a flowchart of FIG. 12.

(1) When the channel processor (CHP0) 50 becomes faulty, the service processor (SVP) 3 detects a fault in the channel processor (CHP0) 50 and collects fault information about the channel processor (CHP0) 50. Thereafter the service processor (SVP) 3 instructs the channel processor (CHP1) 51 to connect to the channel processor (CHP1) 51 the channels (CHs) so far connected to the channel processor (CHP0) 50 (step 1301 to 1304).

(2) The channel processor (CHP1) 51 receiving the instruction from the service processor (SVP) 3, with use of the from-CPC MS store packet 82 in FIG. 10, issues a store request to the system controller (SC) 21, and rewrites the connection-destination CHP number of the channel (CH0) registered as already connected to the channel processor (CHP0) 50 in the table (TABLE) 20, to the CHP number of the channel processor (CHP1) 51 shown in FIG. 6 (step 1305).

(3) Further, when the channel processor (CHP1) 51 resets at '1' the flip-flops (SELCHPs) 610 of the channels (CHs) (including the channel (CH0)) set at '0', these channels (CHs) are logically switched and connected to the channel processor (CHP1) 51 (step 1306).

(4) When an SSCH instruction is issued from the program to the input/output device associated with the subchannel (SUBCH0) under this condition, the channel processor (CHP1) 51 performs input/output operation with use of the switched channels (CHs) (such as the channel (CH0)), through the operation explained in connection with the flowchart of FIG. 11 (step 1307).

Explanation will then be made as to the operation of the system when the faulty channel processor (CHP0) 50 is switched to the normal channel processor (CHP) during the operation of the system to restart the operation, with reference to a flowchart of FIG. 13.

(1) After the faulty channel processor (CHP0) 50 is switched to the normal channel processor (CHP) during the operation of the system, the service processor (SVP) 3 instructs the new channel processor (CHP0) 50 to execute its initializing operation (step 1401).

(2) The channel processor (CHP0) 50 executes the initializing operation under the instruction of the service processor (SVP) 3. After completion of the initializing operation of the channel processor (CHP0) 50, the service processor (SVP) 3 instructs the channel processor (CHP1) 51 to connect to the channel processor (CHP0) 50 the channels (CHs) (including the channel (CH0) 60) so far connected to the channel processor (CHP0) 50 prior to the fault generation (steps 1402 and 1403).

(3) The channel processor (CHP1) 51 receiving the instruction from the service processor (SVP) 3 in the step 1403 monitors CH busy flags of the channels (CHs) (including the channel (CH0) 60) within the local storage (LS) 57 in FIG. 9 in such a manner that, when the flag is changed to '0', that is, when the channel (CH) completes its input/output operation under control of the channel processor (CHP1) 51, the channel processor (CHP1) 51 changes the initiation code of the CHP-to-CH initiation packet 80 in FIG. 10 to '00', and transmits it to the channel (CH0) 60 to instruct the channel (CH) to execute the forced IDLE (steps 1404 and 1405).

(4) The channel (CH0) 60 receiving the aforementioned instruction responds to the channel processor (CHP1) 51 with CC=0 in the CH-to-CHP interruption packet 81 if it can suppress acceptation of a new interruption caused by activation of the input/output device, and with CC=2 in the CH-to-CHP interruption packet 81 if it cannot suppress accept of a new interruption caused by activation of the input/output device. The operation of the channel (CH0) is not illustrated in the drawing.

(5) The channel processor (CHP1) 51 again monitors the CH busy flag of the channel (CH0) 60 and waits until the flag becomes '0', when receiving the packet 81 of CC=2 as a response from the channel (CH0). When receiving the packet 81 of CC=0, issues a store request to the system controller (SC) 21 with the from-CPC MS store packet 82 in FIG. 10, and rewrites that part of the table (TABLE) 20 corresponding to the channel (CH0) 60 to the channel processor (CHP0) 50 as shown in FIG. 5 (steps 1406 and 1407).

(6) Further, the channel processor (CHP1) 51 performs logical connection switching operation to connect the channels (including the channel (CH0) 60) to the channel processor (CHP0) 50 by switching the flip-flops (SELCHPs) 610 of the channels (including channel (CH0) 60) to '0'. Thereafter the channel processor (CHP1) 51 informs the service processor (SVP) 3, as a notification, of the fact that the channel (CH0) 60 was switched as connected to the channel processor (CHP0) 50 (steps 1408 and 1409).

(7) When receiving the notification, the service processor (SVP) 3 informs the channel processor (CHP0) 50, as a notification, of completion of connection of the channels (including the channel (CH0) 60) to the channel processor (CHP0) 50 (step 1410).

(8) The channel processor (CHP0) 50 receiving the notification instructs the channels (including the channel (CH0) 60) to release the forced IDLE thereof by setting the initiation code of the CHP-to-CH initiation packet 80 in FIG. 10 at '01' and then transmitting it (step 1411).

(9) The channels (including the channel (CH0) 60) thereby release their suppressed state of acceptation of the new interruption from the input/output device. Further, the channel processor (CHP0) 50 can start input/output activating operation to/from the channels (including the channel (CH0) 60). The input/output processing operation is carried out according to the flowchart already explained in connection with FIG. 11 (step 1412).

The foregoing embodiment of the present invention can exhibit effects which follow.

(1) Each of the channels (CHs) has paths connected to the a plurality of channel processors (CHPs), so that, even when one of the channel processors (CHPs) became faulty, the channels (CHs) so far controlled by the faulty channel processor (CHP) can be switched to the normal channel processor (CHP) and thus be continuously used.

(2) When the instruction processor (IP) is started, provision of a means for selecting one of the channel processors (CHPs) to be started enables updating of the selecting means by the channel processor (CHP). Further, when the selecting means is built in a conversion table showing the relationship between the logical CH number instructed by the program and the physical CH number used by the instruction processor (IP), the startable channel processor (CHP) can be efficiently selected and started.

(3) When the channel (CH) applies an interruption to the instruction processor (IP), provision of the means for selecting an interruptable channel processor (CHP) within the channel (CH) enables the efficiently interruptable channel processor (CHP) to be selected for execution of the interrupting operation.

(4) After the faulty channel processor (CHP) was switched during the operation of the system, the channel processor (CHP) can perform connection switching operation between the channel processor (CHP) and channels (CHs) while the channel processor (CHP) monitors the load states of the channels (CHs). As a result, the present invention can return the connection state between the channel processor (CHP) and channels (CHs) to its original state without influencing the input/output operation.

What is claimed is:

1. An input/output processing system comprising:

a central processing unit;

a plurality of channels for data transfer with a plurality of input/output devices; and a plurality of channel processors which control the plurality of channels, wherein each of said plurality of channel processors has paths to be connected to said plurality of channel processors and the system comprises, first means for determining one of a plurality of initiation-available channel processors which initiates the channel when said central processing unit initiates one of the channels, and wherein said first means is provided in the form of a table showing correlations among logical channel numbers to be used by a program, physical channel numbers to be used by hardware and usable channel processor numbers.

2. An input/output processing system as set forth in claim 1, wherein, when an interruption is applied from said input/output device to the central processing unit, second means is provided for determining one of the plurality of channel processors having the channels connected to the input/output device, from which the interruption is applied.

3. An input/output processing system as set forth in claim 2, wherein said first means is provided within a main storage and said second means is provided in each of the channels.

4. An input/output processing system as set forth in claim 2, wherein, when one of said plurality of channel processors has become faulty, said first and second means are changed to cause the other normal channel processor to initiate all the channels and to receive an interruption from all the channels to thereby perform input/output operation.

5. An input/output processing system as set forth in claim 4, wherein the fault of said channel processor is detected by a service processor, said service processor issues an instruction to the other channel processor to cause the channels so far connected to the faulty channel processor to be connected to the other channel processor, and the channel processor receiving the instruction changes said first and second means.

6. An input/output processing system as set forth in claim 5, wherein, after said faulty channel processor has been replaced by the normal channel processor during operation of said system, said service processor initializes another channel processor, issues an instruction to the normal channel processor to cause the channels so far connected to the faulty channel processor to be connected to another channel processor.

* * * * *